W. TROTTER, Jr.
MATCH SAFE.
No. 9,967. Reissued Dec. 13, 1881.
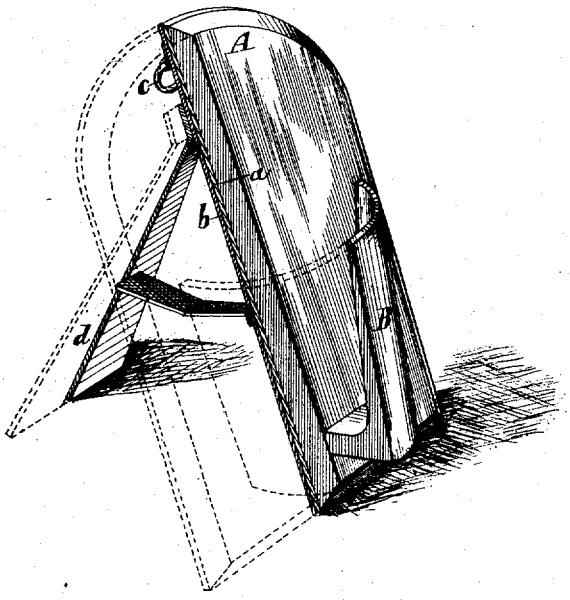
*Witnesses*
Fred. Haynes
Ed. Moran
*Inventor*
Wm Trotter Jun
by his Attorneys
Brown & Brown

UNITED STATES PATENT OFFICE.

WILLIAM TROTTER, JR., OF OYSTER BAY, NEW YORK.

MATCH-SAFE.

SPECIFICATION forming part of Reissued Letters Patent No. 9,967, dated December 13, 1881.

Original No. 248,898, dated November 1, 1881. Application for reissue filed November 17, 1881.

*To all whom it may concern:*

Be it known that I, WILLIAM TROTTER, JR., of Oyster Bay, in the county of Queens and State of New York, have invented a new and useful Improvement in Match-Safes, of which the following is a specification, reference being had to the accompanying drawing.

This invention relates to match-safes which are illuminated by the application of a phosphorescent material, which, by being exposed to the light during the day, is made to become sufficiently luminous at night to enable it to be easily distinguished in a dark room, and thereby to facilitate the finding of the matches when it is desired to light the gas or a lamp in the room.

The invention consists in a match-safe provided with an exposed tablet of glass, having at its back a phosphorescent compound, whereby the safe is made visible in the dark; also, in a novel combination of the match-receptacle with such tablet, as hereinafter described.

The drawing is a sectional perspective view of a safe constructed according to my invention.

A is the tablet, made of glass and of any suitable form.

B is the pocket or receptacle for the matches, which may be either of glass or other material, secured, by cement or other means, to the tablet A. The area of the section of the pocket or receptale B, taken in a plane parallel with the face of the tablet, is so much smaller than the said face, and the pocket or receptacle so arranged upon the said face, that the latter projects or extends beyond or outside of the former at the top and sides.

The back of the tablet is coated, as shown at *a*, with a phosphorescent paint or varnish, preferably with a luminous paint composed of sulphide of calcium as a base and a vehicle consisting of any of the siccative oils or paint-varnishes; and this coating *a* is shown as covered for protection against wear or scratching with a backing, *b*, of paper, leather, or other suitable material.

The safe thus constructed may be furnished with a ring, *c*, or its equivalent, by which to hang it against a wall, or with a hinged back piece, *d*, to enable it to stand like an easel on a mantel-piece or table.

The match-safe thus constructed, having been exposed to the light of the sun during the day, will have the phosphorescent material *a* so excited by the actinic ray that the said material will become sufficiently luminous to illuminate the tablet A during the night, and the portion of the tablet exposed to view outside of the pocket or receptacle B will be so easily distinguished in a dark room as to enable a person to see the match-safe.

What I claim as my invention, and desire to secure by Letters Patent, is—

1. A match-safe provided with an exposed tablet of glass having at its back a phosphorescent compound, whereby the safe is made visible in the dark, substantially as herein described.

2. A match-safe comprising an exposed tablet of glass having at its back a phosphorescent compound and a receptacle placed in front of the said tablet, substantially as herein described.

3. A match-safe composed of a tablet of glass having its back coated with a phosphorescent compound, and a pocket or receptacle attached to the face of the said tablet, but covering only a portion of the said face, substantially as herein described.

WM. TROTTER, JR.

Witnesses:
FREDK. HAYNES,
ED. MORAN.